United States Patent [19]

Sutoh et al.

[11] 4,340,112
[45] Jul. 20, 1982

[54] VEHICLE AIR TEMPERATURE CONTROL APPARATUS

[75] Inventors: Shinji Sutoh; Seiji Sumikawa, both of Konan; Toshizo Hara, Higashi Matsuyama, all of Japan

[73] Assignee: Diesel Kiki Company, Ltd., Tokyo, Japan

[21] Appl. No.: 179,313

[22] Filed: Aug. 18, 1980

[30] Foreign Application Priority Data

Aug. 20, 1979 [JP] Japan ................ 54-105680

[51] Int. Cl.³ .................. F25B 29/00; F24F 3/14
[52] U.S. Cl. ......................... 165/16; 165/20; 165/35; 165/42; 237/12.3 A; 98/2.11; 236/44 C
[58] Field of Search ........... 165/16, 20, 21, 30, 165/34, 35, 41, 42, 43; 237/12.3 A; 98/2.09, 2.11; 236/44 C

[56] References Cited

U.S. PATENT DOCUMENTS 3,183,962  5/1965  Steinhagen et al. .......... 165/21
3,656,541  4/1972  Coyle et al. .............. 165/16

FOREIGN PATENT DOCUMENTS 2838397  3/1980  Fed. Rep. of Germany ..... 237/12.3 A

Primary Examiner—Albert W. Davis
Assistant Examiner—Margaret A. Focarino
Attorney, Agent, or Firm—David G. Alexander

[57] ABSTRACT

A main duct (12) contains a heater (19) and has an upper air outlet (22). A bypass duct (31) has an inlet (32) communicating with the main duct (12) upstream of the heater (19) and an outlet (33) communicating with the upper air outlet (22). A humidifier (36) is provided in the bypass duct (31). The bypass duct (31) has a circulated air inlet (37) and a proportioning door (38) for controlling the amount of air entering the bypass duct (31) from the main duct (12) and the circulated air inlet (37) to enable temperature control of the humidified air which is discharged from the upper air outlet (22) against the driver's face. An air cleaner (71) may also be provided in the bypass duct (31) and operated with the humidifier (36).

8 Claims, 3 Drawing Figures

VEHICLE AIR TEMPERATURE CONTROL APPARATUS

BACKGROUND OF THE INVENTION

The present invention relates to an air temperature control apparatus for an automotive vehicle or the like.

In such an apparatus, a heater and a cooler are disposed in a main air flow duct and either outside air or recirculated air is caused to flow through the duct by a blower. A temperature control door proportions the amount of air flow through the heater and cooler and thereby controls the temperature of air which is introduced into a vehicle passenger compartment through an upper air outlet or a lower air outlet.

It is also known to install a humidifier in the vehicle to compensate for driving in extremely dry climates. Generally, the humidifier is installed directly inside the vehicle passenger compartment and occupies an excessive amount of space. In addition, such humidifiers function to humidify the entire passenger compartment and therefore require an excessive amount of electrical power and consume an excessive amount of water.

This problem can be partially solved by providing the humidifier in the main air duct. However, in the heating mode, air is discharged from the duct through the lower outlet against the driver's legs. This arrangement is extremely inefficient since it is desired to discharge the humidified air against the driver's face for maximum effect.

SUMMARY OF THE INVENTION

A temperature control apparatus embodying the present invention includes main duct means having an upper outlet, heating means disposed in the main duct means, and bypass duct means having an inlet which communicates with the main duct means upstream of the heating means and an outlet which communicates with the upper air outlet, and is characterized by comprising humidifier means disposed in the bypass duct means.

In accordance with the present invention, a main duct contains a heater and has an upper air outlet. A bypass duct has an inlet communicating with the main duct upstream of the heater and an outlet communicating with the upper air outlet. A humidifier is provided in the bypass duct. The bypass duct has a circulated air inlet and a proportioning door for controlling the amount of air entering the bypass duct from the main duct and the circulated air inlet to enable temperature control of the humidified air which is discharged from the upper air outlet against the driver's face. An air cleaner may also be provided in the bypass duct and operated with the humidifier.

It is an object of the present invention to provide an improved vehicle temperature control apparatus comprising humidifier means which discharges humidified air at a desired temperature against a driver's face for maximum effect.

It is another object of the present invention to provide vehicle humidifier means which are much more effecient than comparable prior art.

It is another object of the present invention to provide a generally improved vehicle temperature control apparatus.

Other objects, together with the foregoing, are attained in the embodiments described in the following description and illustrated in the accompanying drawing.

DESCRIPTION OF THE PREFERRED EMBODIMENTS

While the vehicle temperature control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
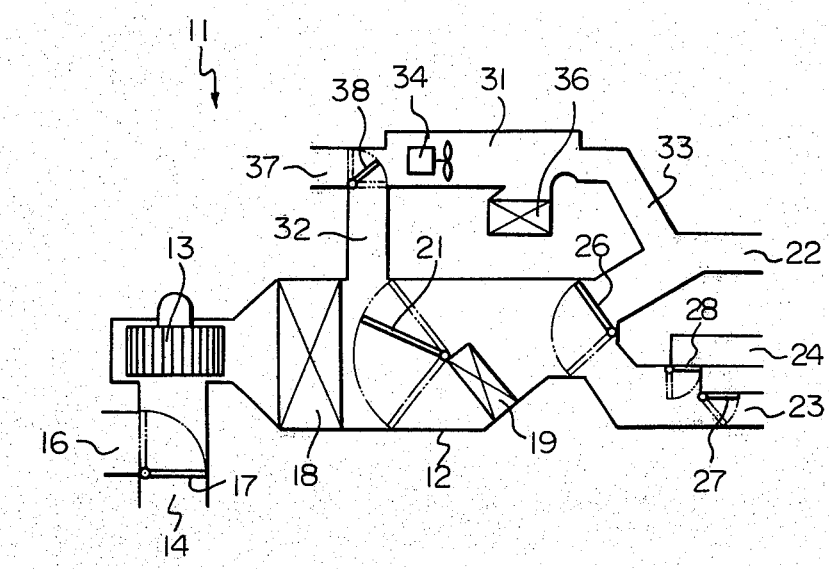
FIG. 1 is a schematic view of a vehicle air temperature control apparatus embodying the present invention.

Referring now to FIG. 1 of the drawing, a vehicle air temperature control apparatus is generally designated by the reference numeral 11 and comprises a main air flow duct 12. A blower 13 forces air through the duct 12 from left to right from either an outside air inlet 14 or a recirculated air inlet 16. A door 17 is provided to select one of the inlets 14 and 16.

An evaporator core 18 of a refrigerant or air conditioning system is disposed in the duct 12 for cooling the air passing therethrough. A heater core 19 is disposed in the duct 12 downstream of the evaporator core 18 for heating the air passing through the duct 12. A temperature control door 21 is provided to control the amount of air passing through the heater core 19 and thereby the temperature of the air passing through the duct 12. The temperature controlled air is discharged into a vehicle passenger compartment (not shown) through an upper air outlet 22, a lower air outlet 23 and a defroster outlet 24. A control door 26 selects the upper outlet 22 or the lower outlet 23 whereas a door 27 is operable to open or block the lower air outlet 23. A door 28 is operable to open or block the defroster outlet 24.

In accordance with an important feature of the present invention, a bypass duct 31 is provided having an inlet 32 communicating with the main duct 12 upstream of the heater core 19 and an outlet 33 communicating with the upper air outlet 22. A blower 34 causes air to flow through the duct 31. A humidifier 36 is provided in the duct 31. The duct 31 also has a circulated air inlet 37 and a control door 38 for controlling the amount or proportion of air entering the duct 31 from the duct 12 and inlet 37.

In the heating mode of operation the various control doors or dampers are moved to the solid line positions. Although heated air is discharged from the duct 12 into the passenger compartment through the lower outlet 23, humidified air is discharged from the upper outlet 22 directly against the driver's face. This maximizes the effect of the humidified air since the driver breathes it immediately without dissipation. In addition, the temperature of the discharged humidified air is lower than that of the discharged heated air since the inlet 32 of the bypass duct 31 is communicated with the main duct 12 upstream of the heater core 19. This makes the driver comfortable. With the arrangement, the driver obtains sufficient benefit from the humidified air to be extremely comfortable in all climates but the amount of humidified air required to obtain this benefit is very small. Such a small amount of humidified air is produced with very low expenditure of electrical power and water and is insufficient to fog the vehicle windshield as often occurs with prior art humidification systems.

Figure 2:
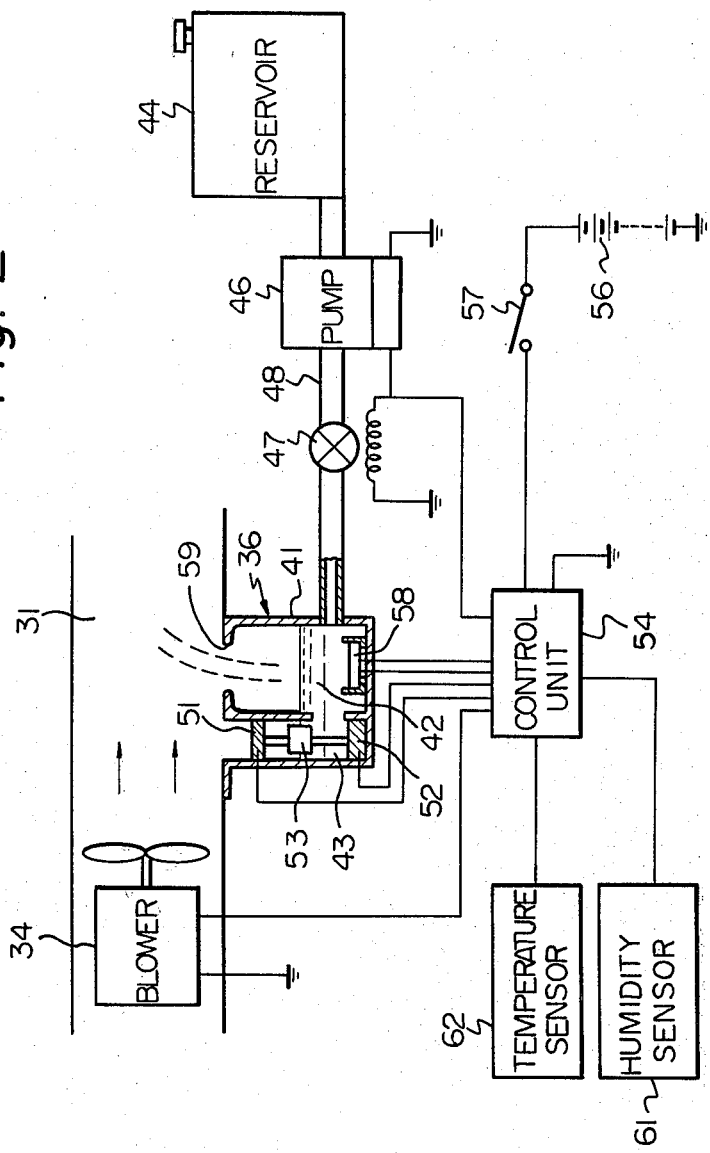
FIG. 2 is a schematic view of humidifier means of the apparatus.

The humidifier 36 is shown in FIG. 2 as comprising a tank 41 having a main water chamber 42 and a float chamber 43. Water is fed into the tank 41 from a reservoir 44 through a conduit 48 by means of a pump 46 and solenoid valve 47. Reed switches 51 and 52 are actuated by a float 53 when the water level exceeds upper and lower limits respectively. The switches 51 and 52 are connected to a control unit 54 which is powered by an electrical source 56 through a power switch 57. The control unit 54 controls the solenoid valve 47 and pump 46 to supply water into the tank 41 and maintain the water level between the limits defined by the switches 51 and 52.

An ultrasonic vibrator 58 is disposed in the chamber 42 and is energized to gradually vaporize the water therein. The vaporized water rises upwardly through an opening 59 in the top of the chamber 42 into the bypass duct 31.

Preferably, a humidity sensor 61 is disposed in the passenger compartment to sense the ambient humidity. The sensor 61 is connected to the control unit 54 to energize the humidifier 36 when the humidity is too low and to shut off the humidifier 36 when the humidity becomes too high to maintain the humidity at a predetermined value.

A temperature sensor 62 may be located in the duct 31 downstream of the humidifier 36 or in the passenger compartment to sense the temperature of the humidified air. The control unit 54 controls the position of the door 38 through a solenoid or the like (not shown) to thereby maintain the temperature at a predetermined value.

Where a plurality of upper air outlets such as 22 are provided, it is only necessary to discharge humidified air from one of the outlets.

Figure 3:
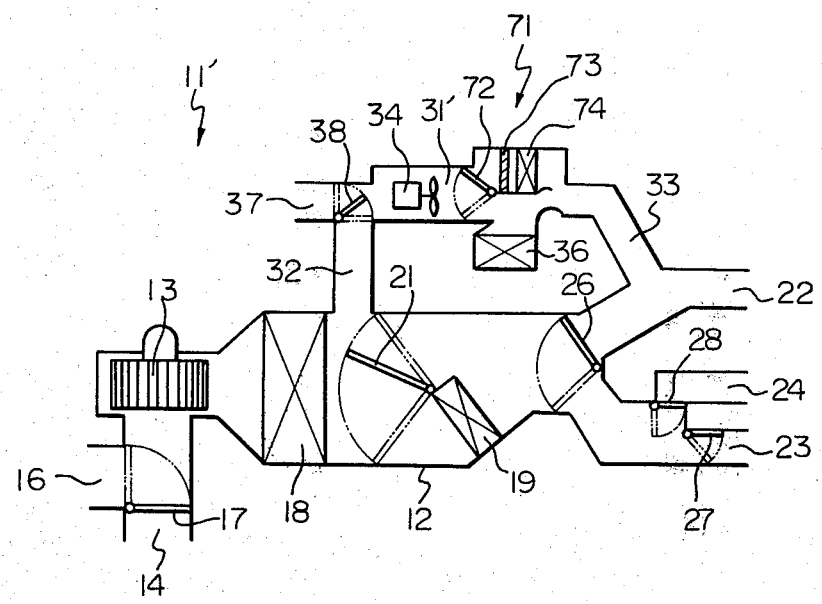
FIG. 3 is a schematic view of a modified arrangement of the present invention.

A modified arrangement embodying the present invention is shown in FIG. 3 where like elements are designated by the same reference numerals and corresponding but modified elements are designated by the same reference numerals primed.

An apparatus 11' comprises a bypass duct 31' in which is disposed an air cleaner 71 in parallel relation with the humidifier 36. A control door 72 is provided so that air flowing through the duct 31' may pass through either one or both of the air cleaner 71 and the humidifier 36. The air cleaner 71 typically comprises a mesh filter 73 and an activated carbon cannister 74.

In summary, it will be seen that the present invention overcomes the drawbacks of the prior art and provides a greatly improved temperature control and humidification system for a vehicle or the like. The arrangement of only discharging humidified air from the upper outlet 22 under all heating and cooling conditions makes it possible to provide the driver and/or passenger with the benefits of humidified air by using only a small volume thereof. The small volume of humidified air will not fog up the inside of the vehicle windshield as in the prior art and thereby promotes safe driving. Various modifications will become possible for those skilled in the art after receiving the teachings of the present disclosure without departing from the scope thereof.

What is claimed is:

1. A temperature control apparatus comprising:
   main duct means having an upper outlet, a lower outlet and control door means for selecting one of the upper outlet and the lower outlet;
   heating means disposed in the main duct means;
   bypass duct means having an inlet which communicates with the main duct means upstream of the heating means and an outlet which communicates with the upper air outlet; and
   humidifier means disposed in the bypass duct means.

2. An apparatus as in claim 1, in which the main duct means further has an outside air inlet, a recirculated air inlet, door means for selecting one of the outside air inlet and the recirculated air inlet and blower means for forcing air through the main duct means from either the outside air inlet or the recirculated air inlet.

3. An apparatus as in claim 2, in which the main duct means further has cooling means upstream of the heating means and temperature control door means for controlling a proportion of air passing through the heating means.

4. An apparatus as in claim 1, in which the bypass duct means further has a circulated air inlet upstream of the humidifier means and proportioning means for controlling a proportion of air flowing through the bypass duct means from the main duct means and the circulated air inlet.

5. An apparatus as in claim 1, further comprising blower means disposed in the bypass duct means for causing air to flow therethrough.

6. An apparatus as in claim 1, further comprising sensor means for sensing an ambient humidity and control means for controlling the humidifier means to maintain the ambient humidity at a predetermined value.

7. An apparatus as in claim 4, further comprising temperature sensor means for sensing a temperature and control means for controlling the proportioning means to maintain the temperature at a predetermined value.

8. An apparatus as in claim 1, further comprising air cleaning means disposed in the bypass duct means in parallel with the humidifier means and control door means for controlling air flow through the humidifier means and the air cleaning means.

* * * * *